Oct. 28, 1969 R. W. BLAIN 3,474,811
PRESSURE-TEMPERATURE COMPENSATED HYDRAULIC VALVE REGULATOR
Filed Oct. 16, 1967 2 Sheets-Sheet 2
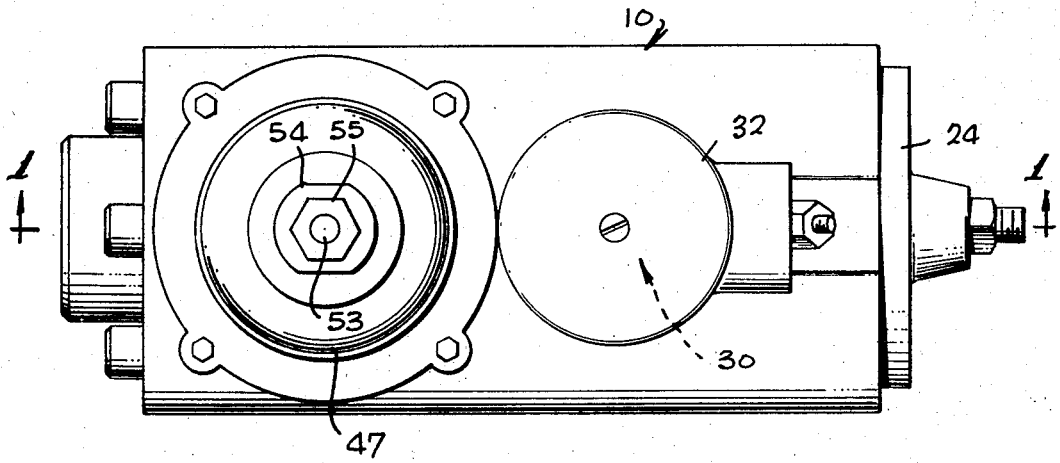
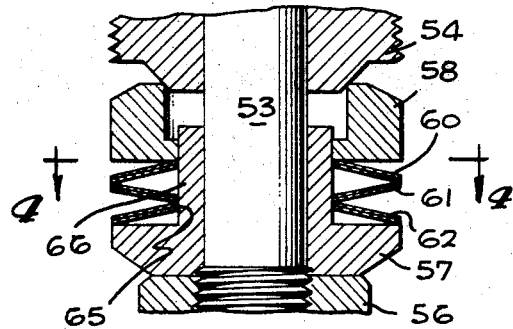
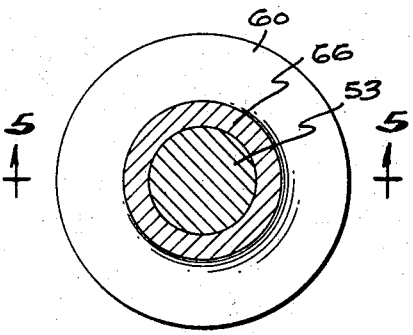
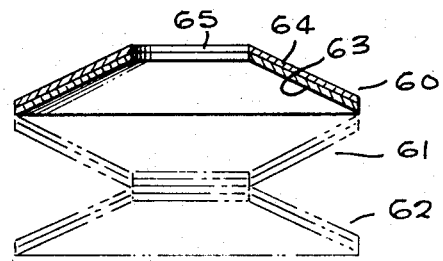
ROY W. BLAIN
INVENTOR.
BY
Beehler & Arant
ATTORNEYS

# United States Patent Office 3,474,811
Patented Oct. 28, 1969

3,474,811
PRESSURE-TEMPERATURE COMPENSATED HYDRAULIC VALVE REGULATOR
Roy W. Blain, La Crescenta, Calif., assignor to Elevator Equipment Company, Los Angeles, Calif., a corporation of California
Filed Oct. 16, 1967, Ser. No. 675,600
Int. Cl. F16k *17/38, 31/36;* G05d *23/00*
U.S. Cl. 137—80                              5 Claims

ABSTRACT OF THE DISCLOSURE

The valve device disclosed is a composite regulator structure the purpose of which is to adjust the rate of flow in response to changes in pressure and temperature. The disclosure is embodied in a composite valve device wherein a master flow valve is set in operation by change in hydraulic pressure initiated by an electrically actuated operating valve. A large diaphragm, responsive to hydraulic pressure conditions in passages through the valve body, alters the position of a regulating poppet valve to increase or decrease the flow depending on prevailing conditions. Interconnected with the diaphragm and the regulating poppet valve is a series of bi-metal spring wafers which are subject to ambient temperature. When the temperature rises and viscosity of the hydraulic fluid accordingly lowers, the wafers flatten out causing the regulating poppet valve to move slightly toward a closed position, thereby building up back pressure in the passages which causes the master flow valve to move in a direction slowing down the flow of fluid. Conversely, lower ambient temperatures will cause the wafers to bow slightly, moving the regulating poppet valve further toward open position. This will lower the back pressure in the valve passages and cause an increase in the flow to compensate for the lower viscosity which is the result of lower temperature.

---

Hydraulic pressure regulator valve devices have heretofore been designed in various embodiments and categories to compensate or smooth out the flow of hydraulic fluid in response to changes in pressure conditions, brought about often by demands of equipment operated by such valves. No matter how carefully pressure regulators are designed, flow conditions will vary as the result of temperature changes because changes in temperature create changes in the viscosity of the hydraulic liquid, which flows more freely at lower viscosities than at higher viscosities. Moreover, pressure compensated hydraulic regulating valves have become highly standardized in certain industries and even though an auxiliary device of some kind might be contrived to compensate for changes in viscosity, unless it is directly coupled, immediately responsive, inexpensive, and adaptable to standard equipment now in use, mere knowledge of the principle and the coupling in of related equipment is not sufficient to provide an adequately dependable result.

It is therefore among the objects of the invention to provide a new and improved pressure-temperature compensated hydraulic valve regulator device which is immediately responsive to changes in ambient temperature and which acts directly upon the flow regulator responsive to pressure demands so that a smooth dependable regulated flow will always be experienced.

Another object of the invention is to provide a new and improved pressure-temperature compensated hydraulic valve regulator device wherein the temperature responsive regulating means is directly coupled and which is of such design and construction that it can be built into pressure regulating means already in existence.

Still another object of the invention is to provide a new and improved pressure-temperature compensated hydraulic valve regulator device wherein the temperature responsive regulating means is simple, inexpensive, easy to install, easy to maintain, and which necessitates virtually a minimum change in existing pressure regulating expedients.

With these and other objects in view, the invention consists in the construction, arrangement, and combination of the various parts of the device, whereby the objects contemplated are attained, as hereinafter set forth, pointed out in the appended claims and illustrated in the accompanying drawings.

In the drawings:

FIGURE 2 is a plan view of the device of FIGURE 1.

FIGURE 3 is a fragmentary longitudinal sectional view taken on the line 3—3 of FIGURE 1.

FIGURE 4 is a cross-sectional view taken on the line 4—4 of FIGURE 3.

FIGURE 5 is a fragmentary cross-sectional view taken on the line 5—5 of FIGURE 4.

Figure 1:
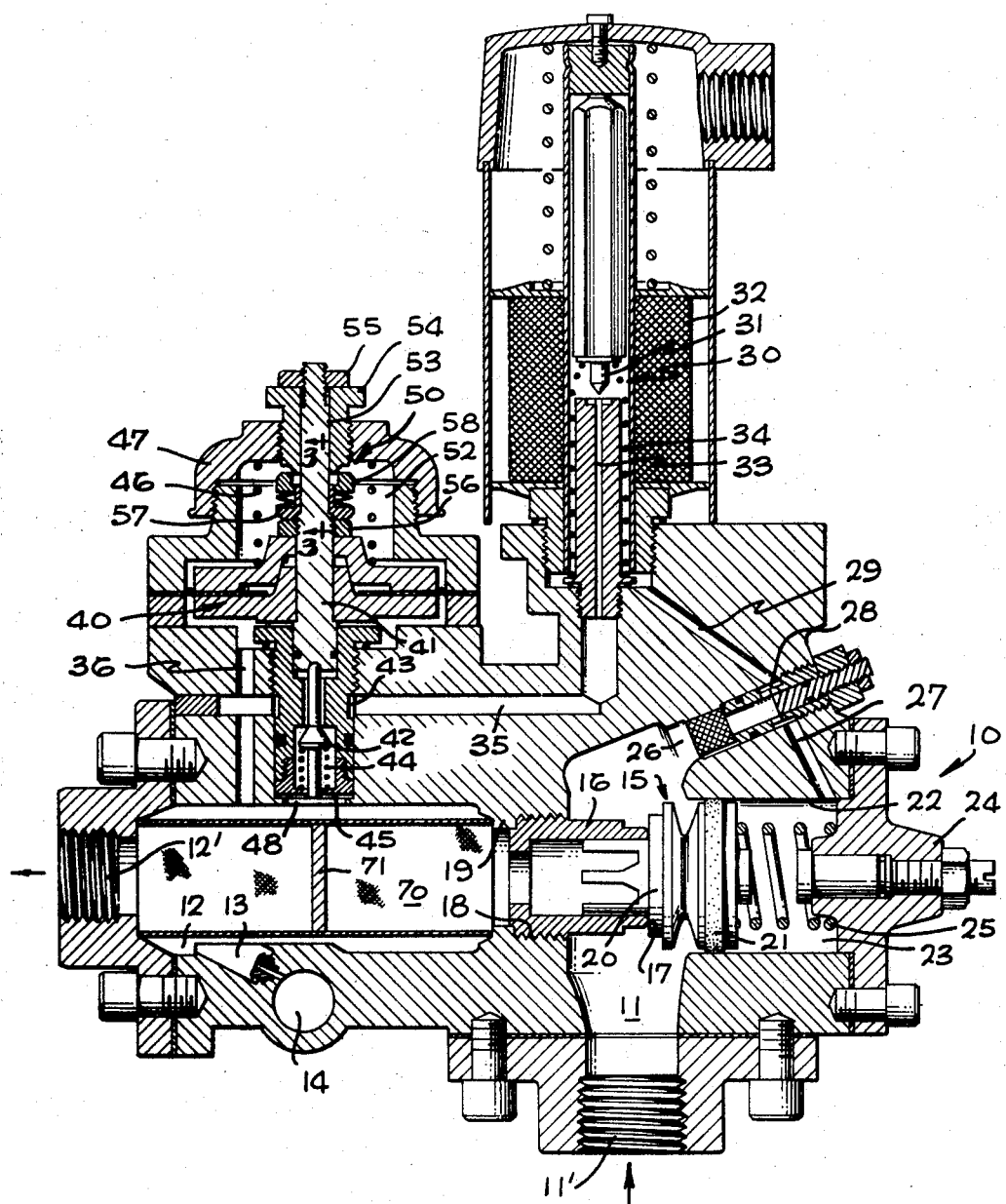
FIGURE 1 is a longitudinal sectional view of an hydraulic valve regulator device taken on the line 1—1 of FIGURE 2.

In an embodiment of the invention chosen for the purpose of illustration there is shown a valve body indicated generally by the reference character 10 of substantial proportions and varied shape so that virtually all portions of the operation, control and regulation can be incorporated into the device by attachment to the same valve body.

Within the valve body is an inflow chamber 11 and an outflow chamber 12, there being an inflow port 11' communicating with the inflow chamber and an outflow port 12' communicating with the outflow chamber 12. The outflow port 12' communicates with a hydraulic fluid reservoir, and a pressure port 13 supplies a line 14 to equipment (not shown) which is to be hydraulically operated. A master valve device is located in the inflow chamber 11 and is identified generally by the reference character 15. The master valve device 15 includes a bushing 16 providing an annular valve seat 17, the bushing having a threaded connection 18 to a restriction 19 intermediate the inflow chamber 11 and outflow chamber 12. Cooperating with the valve seat 17 is a valve element 20. A piston section 21 of the valve element 20 has a longitudinally slidable mounting in a bore 22 which forms a cavity 23 shut-off by the piston section from direct communication with the inflow chamber 11. A cap 24 bolted appropriately to the body 10 closes the cavity 23, and a spring 25, bottomed upon the cap 24 acts against the adjacent side of the piston section 21, in a direction normally tending to close the valve against pressure existing in the inflow chamber 11.

There is provided an upstart passageway 26 in communication with the inflow chamber 11, the upstart passageway being connected to a branch passageway 27 which communicates with the cavity 23. In the upstart passageway is an upstart restriction 28 of previously known construction which allows flow from the inflow chamber 11 through an extension 29 of the upstart passageway 26 to an operating valve indicated generally by the reference character 30. An operating valve element 31 is operated by electric impulses set up in a solenoid 32 so that it can either close a bleed passage 33, acting against pressure of a spring 34, or, moving in an opposite direction, open the bleed passage 33.

The bleed passage communicates with a connecting passage 35 which in turn communicates with a regulating passage 36 and, accordingly, with an adjacent pressure surface of a pressure compensating diaphragm member 40.

Connected to the diaphragm member 40 by means of a stem 41 is a regulating poppet valve element 42, which is adapted to open and close a regulating orifice 43. A spring 44 acting in one direction against a spring keeper spider 45 and in the opposite direction against the regulating poppet valve element 42 acts normally to move the regulating poppet valve element in a direction increasing the restriction of the regulating orifice 43. Acting in an opposite direction is a spring 46, held in position against an adjacent side of the diaphragm member 40 by a cap 47. The regulating orifice 43 is in communication on one side with the communicating passage 35 and on the other side through an opening 48 with the outflow chamber 12.

To compensate for changes in temperature there is provided a temperature responsive assembly indicated generally by the reference character 50, housed in a pocket 52 formed in part by the cap 47. The temperature responsive assembly includes in part an extension 53 of the stem 41 which protrudes outwardly through the cap 47. A leveling control bushing 54 mounts the extension 43 in the cap 47 and acts in cooperation with a transition control nut 55. A lock nut 56 locks the extension 53 to the diaphragm member 40. In the intervening space there is provided a pair of collars 57 and 58 which extend around the extension 53, the collar 57 being in threaded engagement with the extension 53 and the collar 58 being slidable relative to the collar 57 and the extension.

Separating the collars 57 and 58 is a series of bi-metallic warers 60, 61, and 62 which are observable in greater detail in FIGURES 3, 4, and 5. The wafers are so constructed that a high expansion metal portion 63 is on the concave side and the low expansion metal portion 64 is on the convex side so that at higher temperatures the wafers will flatten somewhat, and conversely, at lower temperatures will dish to a greater degree. The wafers are provided with central holes 65 so that they slide freely over sleeve 66 which is part of the collar 57. An outer rim of the wafer 62 bears against the collar 57 and an inner portion of the wafer 60 bears against the collar 58. The level control bushing 54, threadedly mounted as shown in the cap 47, can be screwed in or out as the case may be to change the position of the collars 57 and 58 relative to each other and accordingly change to a slight amount tension on the wafers 60, 61, and 62, for adjustment purposes.

In operation, when the device is in its unactuated position the solenoid 32 being de-energized the operating valve 31 is in its open position. Under this condition hydraulic liquid flows from the inflow chamber 11 through the upstart restriction 28, the upstart passageway extension 29, thence through the bleed passage 33 and connecting passage 35 to the outflow chamber 12. Under the same condition hydraulic liquid escapes from the cavity 23 through the passageway 27 following the same path just described. The result of this is a lowering of pressure on the right side of the piston section 21, as viewed in FIGURE 1, which thereby permits hydraulic liquid under pressure in the inflow chamber 11 to lift the valve element 20 and thereby admit flow of hydraulic liquid from the inflow chamber 11 to the outflow chamber 12. Turbulence is reduced in this flow by the presence of a screen 70 and intervening baffle 71 whereby the liquid upon entering the interior of the screen 70 is deflected laterally outwardly into the outflow chamber 12 from which it again passes through the screen on its way to the outflow port 12'.

As this flow increases, pressure builds up in the outflow chamber 12 and acts on the exposed side of the diaphragm member 40, pushing the diaphragm member up against the temperature responsive assembly 50. This upward movement allows the regulator poppet valve element 42 to move a greater distance into the regulating orifice 43 tending to close the orifice, thereby building up back pressure in the cavity 23. This continues until the master valve device 15 assumes some position whereby the flow through to the discharge chamber 12 is sufficient to maintain enough pressure on the diaphragm member 40 to provide a stable condition of the valve.

If the hydraulic liquid is hot, the liquid will flow more freely and will require a larger volume to be flowing through the discharge chamber before that pressure is built up, whereby the valve reaches its stabilizing condition. Conversely, colder temperatures will cause a slower flow of the hydraulic liquid to provide the stabilized pressure.

Inasmuch as it is this regulated pressure which, acting on the diaphragm member, positions the regulating poppet valve element it will be understood that if temperature change is also employed to modify the position of the regulating poppet valve element, variations in the flow of hydraulic liquid will be reduced to desired limits.

More particularly, when there is an increase in ambient temperature, which affects all parts of the valve assembly as well as the hydraulic liquid, the wafers will tend to flatten somewhat. This action allows the regulator poppet valve element to move in a direction partially closing the regulator orifice 43. As a consequence, back pressure is built up in the cavity 23 causing a slight closing of the master valve device 50. Closing as described, the action prevents an increase in the flow of hydraulic fluid to the discharge chamber which would otherwise take place as the result of a lowering of the viscosity due to increase in temperature.

Conversely, when the ambient temperature lowers the wafers 60, 61, and 62 tend to bow or dish to a greater degree. The result of this is to shift the position of the regulator poppet valve element to one causing an increase in the size of the regulator orifice 43. As a consequence, back pressure in the cavity 23 tends to lower which results in the master valve 20 moving slightly more toward an increased open position, the ultimate result of which is to allow a greater flow of the hydraulic liquid which now has a slightly higher viscosity because of the cooler ambient temperature.

In order to refine and adjust the effect of the bi-metallic wafers, the level control bushing 54 can be screwed in or out and locked in a proper position. When the term "level control bushing" is applied, it assumes that the assembly is one which is being employed to regulate pressure in a hydraulic supply line 72 for hydraulically actuated elevators which need to be adjusted and regulated that they will approach the floor at a reduced constant speed, as they are moved from one floor to another under hydraulic pressure. It will be understood, however, that the device is equally adaptable to other types of hydraulically actuated machinery where fineness of adjustment is an attribute.

While the invention has herein been shown and described in what is conceived to be a practical and effective embodiment, it is recognized that departures may be made therefrom within the scope of the invention, which is not to be limited to the details disclosed herein but to be accorded the full scope of the claims so as to embrace any and all equivalent devices.

Having described the invention, what is claimed as new in support of Letters Patent is:

1. A pressure-temperature compensated hydraulic valve regulator device comprising a body having an inflow chamber for fluid under pressure, an outflow chamber in communication with said inflow chamber and a master valve between said chambers for varying the rate of flow therebetween, a control cavity in said body, a piston section in said cavity connected to said master valve and yieldable means acting on said master valve biased to close said valve, an upstart passage means communicating between said inflow chamber, said cavity and said discharge chamber, an operating valve in said upstart passage means and control means for actuating said operating valve, a regulator diaphragm having a pressure side in communication with said upstart passage means and yieldable counteracting means acting on said diaphragm in an opposite direction, a separate regulating passage communicating between a portion of said diaphragm and said discharge chamber, a regulating poppet valve in said regulating passage and means normally biasing said poppet valve toward closed position, and a temperature responsive flow compensating means exposed to ambient temperature acting on said regulating poppet valve element in a direction effecting a shift in position of said regulating poppet valve whereby to modify action of said master valve and the rate of flow to said discharge chamber in response to changes in ambient temperature.

2. A pressure-temperature compensated hydraulic valve regulator device of claim 1 wherein said temperature responsive flow compensating means is mounted in a position acting on said regulator diaphragm in a direction opposed to action thereon of pressure in said outflow chamber.

3. A pressure-temperature compensated hydraulic valve regulator device of claim 1 wherein said temperature responsive flow compensating means comprises at least one concavo-convex bi-metallic wafer acting between said body and said regulating poppet valve element.

4. A pressure-temperature compensated hydraulic valve regulator device of claim 1 wherein said temperature responsive flow compensating means comprises an extension on said regulating poppet valve element extending through said diaphragm, a series of concavo-convex bi-metallic wafers slidably mounted on said extension and acting between said diaphragm and said body.

5. A pressure-temperature compensated hydraulic valve regulator device of claim 4 wherein said extension extends outwardly through the body and wherein there is a bushing on said extension in threaded engagement with the body, said bushing being in engagement with said set of wafers and movable toward and away from said wafers whereby to modify the action of said wafers.

References Cited

UNITED STATES PATENTS

| 2,635,636 | 4/1953 | Carson | 251—44 |
| 3,053,281 | 9/1962 | Taylor | 236—92 |

WILLIAM F. O'DEA, Primary Examiner

HOWARD M. COHN, Assistant Examiner

U.S. Cl. X.R.

137—489; 236—80, 84, 92; 251—44